United States Patent
Ferchland et al.

(10) Patent No.: US 10,117,045 B2
(45) Date of Patent: *Oct. 30, 2018

(54) CIRCUIT OF A NODE AND METHOD FOR TRANSIT TIME MEASUREMENT IN A RADIO NETWORK

(71) Applicant: Atmel Corporation, San Jose, CA (US)

(72) Inventors: Tilo Ferchland, Dresden (DE); Michael Schmidt, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,410

(22) Filed: Jan. 15, 2016

(65) Prior Publication Data

US 2016/0135003 A1    May 12, 2016

Related U.S. Application Data

(63) Continuation of application No. 12/824,874, filed on Jun. 28, 2010, now Pat. No. 9,239,370.

(Continued)

(30) Foreign Application Priority Data

Jun. 29, 2009    (DE) .................. 10 2009 031 181

(51) Int. Cl.
*H04J 1/16*    (2006.01)
*H04W 4/02*    (2018.01)
(Continued)

(52) U.S. Cl.
CPC ............ *H04W 4/02* (2013.01); *G01S 5/0289* (2013.01); *G01S 13/765* (2013.01);
(Continued)

(58) Field of Classification Search
CPC .... G01S 13/765; G01S 5/0289; H04J 3/0682; H04L 1/1848; H04L 1/188; H04L 1/205; H04W 4/02; H04W 56/0055; H04W 56/0065

See application file for complete search history.

(56) References Cited

U.S. PATENT DOCUMENTS 5,220,332 A    6/1993  Beckner et al.
6,011,974 A *  1/2000  Cedervall ............ G01S 5/0036
                                                      342/457

(Continued)

FOREIGN PATENT DOCUMENTS

WO    WO 2005/088342    9/2005

OTHER PUBLICATIONS

Ciurana, M.; Barcelo-Arroyo, F.; Izquierdo, F.: A ranging system with IEEE 802.11 data frames. In: IEEE Radio and Wireless Symposium, Jan. 9-11, 2007, Long Beach, CA, USA, pp. 133-136—ISBN 1-4244-0444-4.

(Continued)

*Primary Examiner* — Kan Yuen

(74) *Attorney, Agent, or Firm* — Fish & Richardson P.C.

(57) ABSTRACT

A circuit of a node in a radio network and method for transit time measurement between a first node and a second node of a radio network is provided. A frame is transmitted by the first node, wherein the frame requires an acknowledgment of reception by the second node. A first point in time of the transmission of the frame is established by the first node by a time counter. The frame is received by the second node at a second point in time. The acknowledgment is transmitted by the second node to the first node at a third point in time, wherein the third point in time depends on the second point in time by a predetermined time interval between the second point in time and the third point in time. A fourth point in time is established by the first node by the time counter when the acknowledgment is received. The transit time or the change in transit time is determined from the first point in time established by the time counter and from the established fourth point in time and from the predetermined time interval.

10 Claims, 1 Drawing Sheet

Related U.S. Application Data

(60) Provisional application No. 61/221,809, filed on Jun. 30, 2009.

(51) Int. Cl.
    *G01S 5/02*     (2010.01)
    *G01S 13/76*     (2006.01)
    *H04J 3/06*     (2006.01)
    *H04L 1/18*     (2006.01)
    *H04L 1/20*     (2006.01)
    *H04W 56/00*     (2009.01)

(52) U.S. Cl.
    CPC ............ *H04J 3/0682* (2013.01); *H04L 1/188* (2013.01); *H04L 1/1848* (2013.01); *H04L 1/205* (2013.01); *H04W 56/0055* (2013.01); *H04W 56/0065* (2013.01)

(56) References Cited

U.S. PATENT DOCUMENTS

| | | |
|---|---|---|
| 8,284,669 B2 | 10/2012 | Jackson |
| 2004/0037317 A1* | 2/2004 | Zalitzky .................. H04B 3/54 370/466 |
| 2004/0165543 A1 | 8/2004 | Nakazawa |
| 2005/0058081 A1* | 3/2005 | Elliott .................. G01S 13/825 370/252 |
| 2007/0217343 A1* | 9/2007 | Znamova ............... H04J 3/0682 370/252 |
| 2007/0277053 A1 | 11/2007 | Timmerman |
| 2009/0270042 A1 | 10/2009 | Miscopein et al. |
| 2009/0297164 A1* | 12/2009 | Horiuchi ............... H04J 3/0682 398/154 |
| 2010/0014541 A1* | 1/2010 | Harriman ............ H04L 12/4633 370/458 |
| 2010/0128652 A1 | 5/2010 | Lee et al. |

OTHER PUBLICATIONS

IEEE 802.11. In: Wikipedia, The Free Encyclopedia. Status: Jun. 25, 2009, URL: https://en.wikipedia.org/w/index.php [accessed on Jul. 27, 2018].

Official Communication, Examination Report dated Jul. 30, 2018 from German Application No. 10 2009 031 181.5, including English translation, 12 pages.

* cited by examiner

CIRCUIT OF A NODE AND METHOD FOR TRANSIT TIME MEASUREMENT IN A RADIO NETWORK

CROSS-REFERENCE TO RELATED APPLICATIONS

This application is a continuation of U.S. patent application Ser. No. 12/824,874, filed Jun. 28, 2010, which claims priority to German Patent Application No. DE 10 2009 031 181.5, which was filed in Germany on Jun. 29, 2009, and to U.S. Provisional Application No. 61/221,809, which was filed on Jun. 30, 2009, the entire contents of each of which are herein incorporated by reference.

BACKGROUND OF THE INVENTION

Field of the Invention

The present invention relates to a circuit of a node in a radio network and a method for transit time measurement between two nodes in a radio network.

Description of the Background Art

A radio network is defined in the industry standard IEEE 802.15.4-2006. On pages 21 to 23 of this standard, packets to be transmitted by radio are defined, which can contain different frames, such as a beacon frame, data frame, acknowledgment frame, or MAC command frame, for example.

Known from U.S. Pat. No. 5,220,332 is a range finding system with an interrogator and a transponder, which permits non-simultaneous measurements between two objects. A carrier signal is modulated with a (low-frequency) modulation signal having a variable modulation frequency in order to determine a distance between the interrogator and the transponder from the change in the modulation signal by means of a phase measurement or alternatively a transit time measurement.

SUMMARY OF THE INVENTION

It is therefore an object of the present invention to improve a method for transit time measurement to the greatest extent possible, so that the method can be integrated into a radio network with the least possible additional effort.

Accordingly, a method for transit time measurement between a first node and a second node of a radio network is provided. The radio network is preferably defined in conformance with an industry standard, in particular IEEE 802.15.4. By means of the transit time measurement, a distance between the first node and the second node can be determined, for instance.

A frame is transmitted by the first node, in particular as a component of a packet. The frame contains data, such as address data or payload data. These data are transmitted to the second node by means of the frame. In order to send, a spreading of the bits of the frame and a modulation on a carrier signal are carried out, for example. The frame requires an acknowledgment of reception by the second node. The acknowledgment can also be referred to as confirmation of receipt.

A first point in time of the transmission of the frame is established by the first node by means of a time counter. In a variant embodiment, the counter is preferably started with a predefined counter value for establishing the first point in time. To this end, the counter value is set to zero, for example. Another variant embodiment provides that the counter counts continuously. To establish the first point in time, the instantaneous counter value is read out of the continuously counting counter and is preferably stored.

In this context, the first point in time is defined chronologically at a structural setup of the frame. For example, the first point in time is defined as the time of a start of transmission of the frame. It is also possible to define the first point in time chronologically before the first frame with respect to a start field (SFD—Start of Frame Delimiter).

The frame is received by the second node at a second point in time. For reception, the second node carries out a demodulation and correlation of a received signal, for example. The received data of the frame are checked by the second node. For the purpose of checking, a determination is made as to whether the data are valid for the second node. For determining validity of the data of the frame, an address contained in the frame is compared with an identification of the second node, for example. Likewise, the received data can be checked for transmission errors with the aid of check bits. The second point in time is also defined chronologically at a structural setup of the frame.

The acknowledgment is transmitted by the second node to the first node at a third point in time. The acknowledgment is transmitted as a function of the validity of the data of the received frame. The third point in time depends on the second point in time. A predetermined time interval is defined between the second point in time and the third point in time. The third point in time thus has a predetermined time separation from the second point in time. The time interval is constant and is preferably known to the first node and second node. For example, the time interval is defined at the setup of the radio network and is set in the second node. The third point in time is defined chronologically at a structural setup of the acknowledgment. For example, if the acknowledgment is defined in accordance with the industry standard IEEE 802.15.4, the third point in time can be defined chronologically at the start of the acknowledgment frame, for instance.

When the acknowledgment is received by the first node, a fourth point in time is established by means of the time counter of the first node. In order to establish the fourth point in time in one variant embodiment, the counter of the first node is stopped. According to another variant embodiment, an additional count value is read out of the running counter in order to establish the fourth point in time. The fourth point in time is likewise defined chronologically at a structural setup of the acknowledgment.

The transit time or the change in transit time is determined from the first point in time established by means of the time counter and from the fourth point in time established by means of the time counter and from the predetermined time interval. If, for example, the counter is started at the first point in time with the predefined count value of zero, the count value when the counter is stopped at the fourth point in time corresponds to a time difference between the fourth and first points in time. Preferably the transit time is calculated by the means that at least the time interval and, if applicable, additional time constants are subtracted from the count value of the time counter, and the difference resulting from the subtraction is divided by two. A simple calculation of the change in transit time is possible by evaluating the time difference between the fourth point in time and the first point in time with one or more preceding measurements, for example by a greater-than/less-than comparison, without the necessity of explicitly calculating the transit time per se.

The invention has the additional object of specifying a circuit of a node of a radio network that is improved to the greatest extent possible. Accordingly, a circuit of a node in a radio network is provided. Preferably the circuit is monolithically integrated on a semiconductor chip.

The circuit is configured to transmit a frame. For transmission, the circuit preferably has a transmitter circuit, in particular with a modulator and an amplifier. In accordance with its definition, the frame to be transmitted requires an acknowledgment of its reception. Preferably the circuit is configured to select precisely the frame with associated acknowledgment.

The circuit has a time counter. The time counter can also be called a timer. The time counter is designed to measure a time interval, for example with the predetermined resolution of a clock generator of the circuit. The circuit is configured to determine a point in time of the transmission of the frame by means of the time counter. For example, the time counter is started with a predetermined count value, or a current count value of the continuously counting time counter is read out, for this purpose.

The circuit is configured to receive the acknowledgment associated with the frame. For reception, the circuit preferably has a receiver circuit, in particular having an input amplifier and a demodulator. Preferably the circuit is configured to switch into a receive mode to receive the expected acknowledgment following the transmission of the frame.

The circuit is configured to establish an additional point in time of the reception of the acknowledgment by means of the time counter. To make this establishment, the circuit is preferably configured to stop the time counter or read out the current count value of the running time counter. The circuit is preferably configured to identify the acknowledgment from a received signal. For example, the circuit has an analysis unit, in particular with a correlator, for identification.

The circuit is configured to detect a transit time or a change in transit time on the basis of the two established points in time and a predetermined constant time interval. The predetermined constant time interval is preferably defined during a configuration of the radio network and is stored in a memory, for example a register, of the circuit.

In addition, a circuit of a node in a radio network is provided, which preferably is likewise integrated on a semiconductor chip together with the aforementioned circuit for a bidirectional connection.

The circuit has a receiver circuit for receiving a frame and a transmitter circuit for transmitting an acknowledgment associated with the frame.

The circuit is configured to delay a transmission time of the transmission of the acknowledgment with respect to a reception time of the reception of the frame by a constant time interval predetermined in the radio network. Preferably the predetermination of the time interval is determined by circuit components of the circuit and/or register entries.

The time interval is predetermined by hardware of the circuit in a bit transmission layer. The bit transmission layer is also called the PHYsical layer. The bit transmission layer (Physical Layer) is the lowest layer. This layer provides electrical and additional functional aids to activate or deactivate physical connections, maintain them, and transmit bits through them.

Another aspect of the invention is a radio network, in particular in conformance with the industry standard IEEE 802.15.4.

Here, a radio network having at least a first node and a second node is provided. The first node and/or the second node each have at least one, preferably both, of the above-mentioned circuits.

The refinements described below relate equally to the method, to the circuit, and to the radio network. Functional features of the circuit may be derived from method features here.

According to an embodiment, provision is made that the received data of the frame are checked by the second node for reception of the frame. The acknowledgment is transmitted by the second node as a function of the check, if the received data of the frame are valid. In contrast, the acknowledgment is not transmitted by the second node as a function of the check if the received data of the frame are not valid.

According to an embodiment, provision is made that the predetermined time interval is dependent on a length of the frame. Here, the predetermined time interval is determined by a constant and by the length of the frame. The constant can be set by means of a clock counter, for example.

In an embodiment, the time interval is predetermined in a bit transmission layer. In this way, the time interval is independent of higher protocol layers in a program sequence of a processor unit.

According to an embodiment, payload data can be transmitted from the first node to the second node by means of the frame. For transit time measurement, the transmission of payload data between the nodes is thus conformant with the standard. A plurality of transit time measurements can be carried out during normal data traffic in the radio network.

The length of the transmitted frame can vary, for example as a function of the amount of the payload data in the frame. The information concerning the length of the frame and the transmission rate is known by the transmitting node. Preferably, therefore, the transit time or the change in transit time is additionally determined on the basis of the length of the transmitted frame. The length of the frame is advantageously likewise subtracted from the time difference between the fourth point in time and the first point in time. In addition, the transit time or the change in transit time can advantageously be determined as a function of the transmission rate.

It is possible that not all nodes in the radio network are compatible with the described transit time measurement. For example, the time interval may not be constant or may vary from one transmission of a frame to the next, with the result that the affected node is not compatible. Preferably the first node determines before or during a transit time measurement whether a transit time measurement with the second node is possible. Preferably, the transit time measurement is performed by the first node as a function of a product identification of the second node. The product identification is preferably transmitted from the second node to the first node before, during or after the transit time measurement. Preferably the product identification is transmitted to the respective other node by means of the frame and/or the acknowledgment. If the product identification of the second node has the result that it is not suitable for a transit time measurement, the transit time measurement is not started, or is stopped, and/or the result is discarded.

The accuracy of the predetermined constant time interval is better than 200 nanoseconds. The accuracy here is preferably independent of higher protocol layers that are used in a program sequence of a processor unit of the circuit. The time interval is preferably defined by a predetermined number of clock cycles of a clock generator of the circuit.

The variant refinements described above are particularly advantageous both individually and in combination. In this regard, all variant refinements may be combined with one another. Some possible combinations are explained in the description of the exemplary embodiments from the figures.

However, these possible ways presented there of combining the variant refinements are not exhaustive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
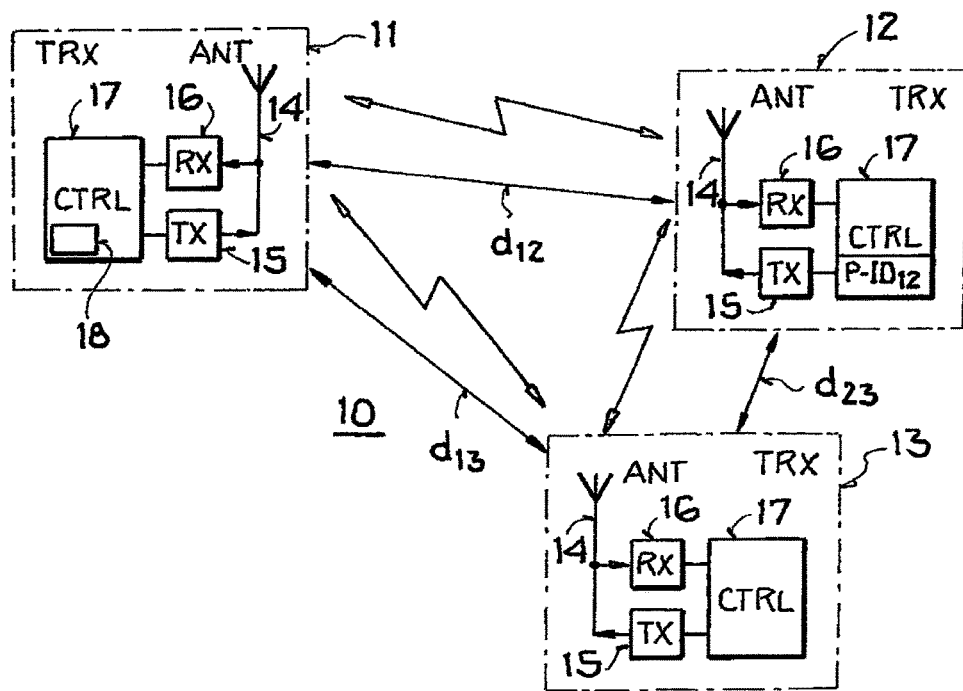
FIG. 1 is schematic representation of a radio network.

FIG. 1 shows an example of a "Wireless Personal Area Network" (WPAN) 10 per IEEE Standard 802.15.4 by way of example. It is comprised of three transmitting/receiving devices (transceiver, TRX) 11-13 in the form of stationary or mobile devices that wirelessly exchange information by means of radio signals. The transmitting/receiving devices 11, 12 and 13 are what is known as a full-function device, which can assume the function of the WPAN coordinator. In addition to a star-shaped network topology, in which bidirectional data transmission can occur only between one of the limited function devices (not shown) at a time and the full-function device 11 (or 12 or 13), but not between the limited function devices, the standard also provides what are called peer-to-peer topologies, in which every full-function device 11, 12, 13 (one of which (11) assumes the role of the WPAN coordinator) can communicate with every other full-function device.

The transmitting/receiving devices 11-13 are each composed of an antenna 14, a transmitting unit (transmitter, TX) 15 connected to the antenna, a receiving unit (receiver, RX) 16 connected to the antenna, and an analysis unit/control unit (control unit, CTRL) 17 connected to the transmitting and receiving units 15/16 for controlling the transmitting and receiving units 15, 16. In addition, the transmitting/receiving devices 11-13 each include a power supply unit (not shown in FIG. 1) in the form of a battery or the like to supply energy to the units 15-17, as well as possible additional components such as sensors, interfaces, etc.

The data transmission can take place in the frequency band (700-900 MHz I 2.4 GHz) defined in the IEEE 802.15.4 standard, for example in the ISM (Industrial, Scientific, Medical) band. The transmitting unit 15 of each transmitting/receiving device 11-13 converts the data stream to be transmitted in each case, for example per the industry standard IEEE 802.15.4, into a radio signal to be radiated through its antenna 14. Accordingly, the receiving unit 16 of each transmitting/receiving device converts a radio signal—received by its antenna 14 (and generated per IEEE 802.15.4 by the transmitting unit of a second transmitting/receiving device)—into the transmitted data in as error-free a manner as possible in that the radio signal is demodulated, among other things, and the data are subsequently detected (decided).

The nodes 11 and 12 are spatially separated from one another by the distance d12, the nodes 11 and 13 by the distance d13, and the nodes 11 and 13 by the distance d23. In order to determine the distance between the nodes 11, 12, 13, a signal transit time can be determined, for example.

Packets, for example per the IEEE 802.15.4 industry standard, are transmitted between the nodes. Each packet has a frame that is transmitted along with it. In this process, a preamble is transmitted first, then a start field (SFD—Start of Frame Delimiter), followed by a packet header (PHR—Phy HeadeR with the information on the frame length, followed by the frame itself.

Figure 2:
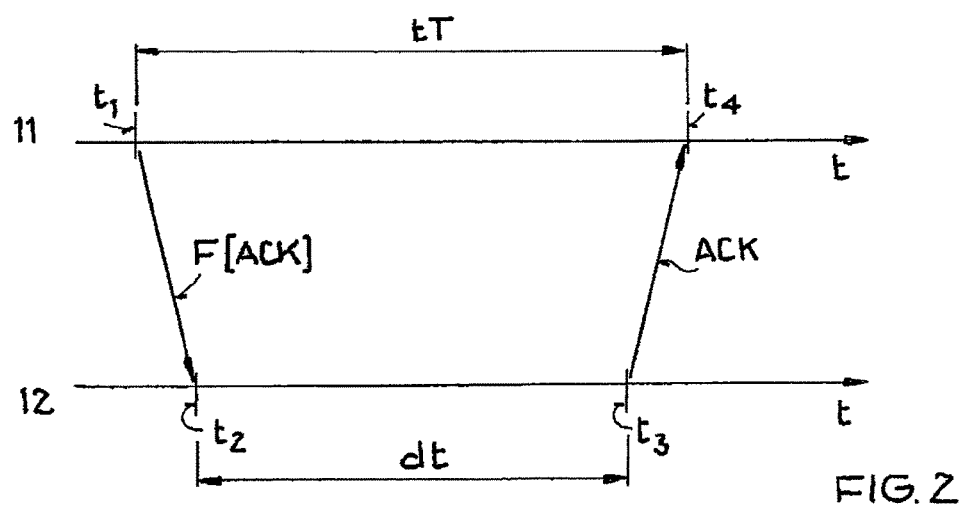
FIG. 2 is a schematic diagram.

The sequence is an example of a packet with a data frame per the IEEE 802.15.4 industry standard. The data frame has a frame control field, a sequence number, an address (addressing fields), and additional fields with payload data. The payload data here typically make up the vast majority of the data frame. A frame F[ACK] is transmitted from node 11 to node 12 between the points in time t1 and t2, as shown in FIG. 2.

The industry standard IEEE 802.15.4 defines packets with a beacon frame, a data frame, a MAC command frame, and an acknowledgment frame. A part of the defined frame F[ACK] requires (per definition in the standard) an acknowledgement (ACK—ACKnowledgment) of the reception from a receiver by means of the acknowledgment frame. As shown in FIG. 2, the acknowledgment ACK is sent back to the transmitter 11 by the receiver 12 of the frame F[ACK] between the points in time t3 and t4. Other packets conforming to other industry standards, such as WLAN, Bluetooth, or WiMax, may have a different structure, for example with a different sequence of the fields, but may likewise require an acknowledgment/confirmation.

Here, the transmitting unit 15 and the receiving unit 16 of a transmitting/receiving device 11, 12, 13 are parts of an integrated circuit (IC) (not shown in FIG. 1), for example of an ASIC (Application Specific Integrated Circuit), while the analysis unit/control unit 17 is implemented by a microcontroller (likewise not shown). In advantageous fashion, the transmitting/receiving device 11, 12, 13 can also have just one IC (for example, implemented as an ASIC), which carries out the functions of the transmitting unit 15, the receiving unit 16, and the analysis unit/control unit 17 combined.

In order to measure the transit time, the time counter (timer) 18 of the control unit 17 of the node 11 is started at a first point in time t1. The first point in time t1 defines transmission of the frame F[ACK] by the first node 11. For example, the point in time t1 can be defined at the end of the transmitted start field (SFD) or at the end of the packet header (PHR). The time counter 18 subsequently counts until the point in time t4, when the acknowledgment ACK is received from the first node 11. A count value tT is read out of the time counter 18.

At the second point in time t2, the frame F[ACK] is received by the second node. The time difference between the first point in time t1 and the second point in time t2 is the transit time of the frame F[ACK] from the first node 11 to the second node 12, although this value cannot be detected directly. The frame F[ACK] is not reflected directly back to the transmitter. A second circuit of the second node 12 is configured to transmit the acknowledgment ACK belonging to the frame F [ACK] at the third point in time t3, however.

The time interval dt between the second point in time t2 when the frame F[ACK] is received and the third point in time t3 when the acknowledgment ACK is transmitted is predetermined and constant. Preferably, the circuit of the second node has a hardware implementation for transmitting the acknowledgment ACK, wherein the time interval dt between the second point in time t2 and the third point in time t3 is defined by a fixed number of clock cycles of a clock generator of the circuit of the second node 12. In advantageous fashion, the time interval dt is fixed by the hardware of the second node 12 or is adjustable by programming to a fixed value.

The accuracy of the predetermined, constant time interval dt depends on the accuracy of the clock generator of the second node 12. An accuracy of 200 nanoseconds or less is necessary for an at least coarse measurement of the transit time. This is achieved through a precise calculation of the spacing between the second point in time t2 and the third point in time t3 by means of a high resolution clock generator. The accuracy is preferably better than 100 nanoseconds. A clock period of 62.5 nanoseconds (16 MHz) is used for this purpose, for example. In contrast, the industry standard IEEE 802.15.4 requires only transmission of the acknowledgment ACK that is accurate to a symbol, although this, with a resultant inaccuracy of 16 µs, does not permit transit time measurement.

The time difference between the third point in time t3 and the fourth point in time t4 depends in turn on the transit time of the acknowledgment ACK from the second node to the first node 11, which again cannot be determined directly, however. The transit time tL can be determined using an extremely simplified formula:

$$tL = \frac{tT - dt}{2} \quad (1)$$

It must be noted here in particular that a frequency offset, for example in the form of a correction factor, should be included for a more precise calculation. However, even without precise calculation, the information obtained with formula (1) can be used in that values of at least two measurements, in particular successive measurements, can indicate—by means of a greater-than/less-than comparison—a direction of motion of the nodes relative to one another, for example production robots or freight containers that are movable relative to one another. For noise suppression, thresholds can be used here, for example.

The transit time tL can be used to determine the distance between the nodes 11 and 12, for example. By means of a clock period of 62.5 nanoseconds (16 MHz), an accuracy in the distance of approximately 10 meters can be achieved in any case. By means of a number of reference positions, this can be used advantageously to locate goods within an industrial site (such as a port) or position them as desired.

While it would be possible to perform more accurate distance measurements with a measurement of the phase, a phase measurement would require additional hardware resources and transmission capacities, and would result in a higher power consumption. In contrast, simple transit time measurement with a standards-conformant frame and an acknowledgment requires no additional resources and can take place during the customary data traffic. Thus, the solution according to FIGS. 1 and 2 achieves the surprising result that data can also be transmitted from the first node 11 to the second node 12 by means of the frame F[ACK] in synergy with the transit time measurement.

In order to ensure improved accuracy and reliability of the transit time measurement, a plurality of transit time measurements can be carried out and analyzed, for example by averaging.

Preferably the first node 11 additionally interrogates a product identification P-ID12 from the second node 2 in order to check whether the second node 12 is designed for transit time measurement. The second node 12 is designed for transit time measurement only when the second node 12 maintains the predefined time interval dt between the reception of the frame F[ACK] and the acknowledgment ACK at a constant value. Alternatively, it is also possible to perform multiple transit time measurements through the first node 11 and abort the transit time measurement in the event of an (excessive) deviation, for example a standard deviation, greater than a specified range. In this case, the second node 12 is not designed or configured for transit time measurement, and does not adequately maintain the predefined time interval dt.

The invention is not restricted to the variant embodiments shown in FIGS. 1 and 2. For example, it is possible to initiate the transit time measurement successively from the two participating nodes 11 and 12 so that first, the first node 11 sends a frame F[ACK] and the second node 12 sends an acknowledgment ACK, and then the second node 12 sends a frame F[ACK]' and the first node 11 sends an acknowledgment ACK'. It is also possible to implement the transit time measurement for another industry standard, such as WLAN or WiMax. The functionality of the nodes 11, 12, 13 from FIG. 1 can be used to particular advantage for a universal radio system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
a transmitting unit, in a first node of a radio network, the transmitting unit configured to transmit a frame from the first node to a second node in the radio network; a control unit, and a receiving unit, in the first node the control unit configured to perform operations comprising:
determining a first point in time of transmission of the frame from the first node to the second node;
receiving, by the receiving unit, an acknowledgment associated with the frame from the second node;
establishing a second point in time of the reception, from the second node, of the acknowledgment;
determining a transit time by:
determining a first difference between the second point in time and the first point in time;
determining a second difference by subtracting a predetermined time interval from the first difference;
halving the second difference;
determining a distance between the first node and the second node based on the transit time; and
determining a direction of motion of the first and second nodes relative to one another based on a comparison of the first difference and the second difference.

2. The circuit according to claim 1, wherein a first count value is read out of a time counter to establish the first point in time of the transmission of the frame; and a second count value is read out of a running time counter to establish the second point in time of the reception of the acknowledgment.

3. A first node in a radio network, the first node comprising:
- a transmitter configured to transmit a frame;
- a receiver configured to receive, from a second node, an acknowledgement associated with the frame; and
- circuitry configured to perform operations comprising:
    - determining a first point in time of transmission of the frame;
    - establishing a second point in time of the reception, from the second node, of the acknowledgment via a time counter; and
    - determining a transit time via the time counter by:
        - determining a first difference between the second point in time and the first point in time;
        - determining a second difference by subtracting a predetermined time interval from the first difference;
        - halving the second difference;
    - determining a distance between the first node and the second node based on the transit time; and
    - determining a direction of motion of the first and second nodes relative to one another based on a comparison of the first difference and the second difference.

4. The first node according to claim 3, wherein, in order to establish the first point in time of the transmission of the frame, one or more of the following is performed:
- the time counter is started with a predefined count value; and
- the time counter is stopped in order to establish the second point in time.

5. The first node according to claim 3, wherein:
- the time counter is a running time counter; and
- one or more of the following is performed:
    - a first count value is read out of the running time counter to establish the first point in time of the transmission of the frame; and
    - a second count value is read out of the running time counter to establish the second point in time of the reception of the acknowledgment.

6. The first node according to claim 3, wherein a transit time measurement is performed as a function of a product identification of the second node.

7. The first node according to claim 3, wherein the predetermined time interval is defined at setup of the radio network.

8. The first node according to claim 3, wherein the transit time is additionally determined from a length of the transmitted frame.

9. The first node according to claim 3, wherein the predetermined time interval is dependent on a length of the frame.

10. The first node according to claim 3, wherein the time interval is predetermined in a bit transmission layer and is independent of higher protocol layers in a program sequence of a processor unit.

* * * * *